United States Patent
Vohra (10) Patent No.: US 8,370,306 B1
(45) Date of Patent: Feb. 5, 2013

(54) SYSTEMS AND METHODS FOR RECOVERING FROM CONTINUOUS-DATA-PROTECTION BLACKOUTS

(75) Inventor: Taher Vohra, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 291 days.

(21) Appl. No.: 12/618,288

(22) Filed: Nov. 13, 2009

(51) Int. Cl.
*G06F 17/00* (2006.01)

(52) U.S. Cl. .................. 707/648; 707/690

(58) Field of Classification Search .............. 707/201, 707/202, 634, 200, 204, 655, 649, 694, 610, 707/640, 802
See application file for complete search history.

(56) References Cited

U.S. PATENT DOCUMENTS

| | | | | |
|---|---|---|---|---|
| 5,049,873 A * | 9/1991 | Robins et al. | ............... | 370/254 |
| 5,155,678 A * | 10/1992 | Fukumoto et al. | ............... | 707/610 |
| 6,092,086 A * | 7/2000 | Martin et al. | ............... | 1/1 |
| 7,467,168 B2 * | 12/2008 | Kern et al. | ............... | 1/1 |
| 7,680,834 B1 * | 3/2010 | Sim-Tang | ............... | 707/999.201 |
| 7,711,700 B2 * | 5/2010 | Prahlad et al. | ............... | 707/802 |
| 7,756,833 B2 * | 7/2010 | Van Ingen et al. | ............... | 707/640 |
| 7,769,731 B2 * | 8/2010 | O'Brien | ............... | 707/694 |
| 7,788,521 B1 * | 8/2010 | Sim-Tang | ............... | 714/4.12 |
| 7,979,396 B1 * | 7/2011 | Krishnamurthy et al. | ............... | 707/655 |
| 8,005,797 B1 * | 8/2011 | Chepel et al. | ............... | 707/649 |
| 8,037,240 B2 * | 10/2011 | Joukov | ............... | 711/112 |
| 8,166,263 B2 * | 4/2012 | Prahlad et al. | ............... | 711/162 |
| 2005/0262097 A1 * | 11/2005 | Sim-Tang et al. | ............... | 707/10 |
| 2006/0106881 A1 * | 5/2006 | Leung et al. | ............... | 707/200 |
| 2006/0282697 A1 * | 12/2006 | Sim-Tang | ............... | 714/1 |
| 2008/0086608 A1 * | 4/2008 | Kano | ............... | 711/162 |
| 2008/0281876 A1 * | 11/2008 | Mimatsu | ............... | 707/202 |
| 2009/0210462 A1 * | 8/2009 | Arakawa et al. | ............... | 707/204 |
| 2010/0017444 A1 * | 1/2010 | Chatterjee et al. | ............... | 707/204 |
| 2011/0196833 A1 * | 8/2011 | Drobychev et al. | ............... | 707/634 |

OTHER PUBLICATIONS

David Wartell, "Computing Deltas-Near-Continuou (CDP)", R1Soft, http://wiki.r1soft.com/display/TP/Computing+Deltas+-+near-Continuous+(CDP, Jul. 2009.

* cited by examiner

*Primary Examiner* — James Trujillo
*Assistant Examiner* — Thong Vu
(74) *Attorney, Agent, or Firm* — Advantedge Law Group (57) ABSTRACT

A computer-implemented method for recovering from continuous-data-protection blackouts may include identifying a continuous data protection system configured to copy each change made to a set of data. The computer-implemented method may also include identifying a set of changes made to the set of data but missed by the continuous data protection system. The computer-implemented method may further include identifying an alternate change-tracking system that tracks changes made to the set of data. The computer-implemented method may additionally include updating the continuous data protection system with the missed set of changes as tracked by the alternate change-tracking system. Various other methods, systems, and computer-readable media are also disclosed.

20 Claims, 6 Drawing Sheets

SYSTEMS AND METHODS FOR RECOVERING FROM CONTINUOUS-DATA-PROTECTION BLACKOUTS

BACKGROUND

Organizations increasingly depend on digitally-stored data in the course of business. In order to protect their data, many organizations may employ a continuous data protection system. Continuous data protection systems may record a copy of each change made to data by using data change tracking/capture mechanisms, allowing organizations to roll their data back to any previous state.

However, in some cases a continuous data protection system may temporarily be unable to record data changes. For example, upgrading the continuous data protection system may require momentarily disabling the change tracking function. In another example, if the data is accessed via a different operating system (e.g., when booting from a live DVD), the change tracking mechanism may not operate and therefore may not capture changes to the data.

Some continuous data protection solutions may attempt to prevent missing any data changes by ensuring that no changes to the data occur while the change tracking subsystem is unable to function. For example, a continuous data protection system may require a system reboot for an upgrade of the continuous data protection system to ensure that no application changes the data while the continuous data protection system is offline. However, interfering with the uptime of a computing system in order to maintain the system's backup infrastructure may be unacceptable. Furthermore, such solutions may not work in cases where the continuous data protection system cannot control the computing system, such as when a different operating system is loaded.

Alternatively, a continuous data protection solution may discover what changes it missed while it was not active by scanning all of the data to determine what data, if any, changed. Unfortunately, this brute force method may both unduly burden system resources and may take a long time to complete. Accordingly, the instant disclosure identifies a need for efficiently and effectively recovering from continuous-data-protection blackouts.

SUMMARY

As will be described in greater detail below, the instant disclosure generally relates to systems and methods for recovering from change tracking blackouts in a continuous-data-protection system. Embodiments of the instant disclosure may recover from continuous-data-protection blackouts by using an alternate change-tracking mechanism (such as a file change log) to determine what data changed during a blackout and updating a continuous-data-protection system with the data changes recorded by the alternate change-tracking mechanism. In one example, various systems described herein may accomplish this task by: 1) identifying a continuous data protection system configured to copy each change made to a set of data, 2) identifying a set of changes made to the set of data but missed by the continuous data protection system, 3) identifying an alternate change-tracking system that tracks changes made to the set of data, and 4) updating the continuous data protection system with the missed changes as tracked by the alternate change-tracking system.

The method for recovering from continuous-data-protection blackouts may be performed in a variety of contexts. For example, as part of identifying the set of missed changes, the method may include determining that the continuous data protection system has stopped copying changes made to the set of data. The method may also include recording a time when the continuous data protection system stopped copying the changes. In some embodiments, the method may include halting a part of the continuous data protection system. For example, the method may include unloading a change tracking driver that is part of the continuous data protection system.

In certain embodiments, the method may also include syncing the file system that manages the set of data (e.g., before consulting the alternate change-tracking system to find any missed changes) by committing pending file system operations.

The method may include identifying the alternate change-tracking system in a variety of contexts. For example, identifying the alternate change-tracking system may include identifying a file change log (e.g., a file change log managed by a file system). In some examples, the method may include initiating the alternate change-tracking system (e.g., start tracking changes to the set of data).

Updating the continuous data protection system with the missed set of changes (as tracked by the alternate change-tracking system) may include writing the missed set of changes to a journal (e.g., of the continuous data protection system). In some examples, updating the continuous data protection system with the missed set of changes may include 1) identifying a set of file system objects affected by the missed set of changes, 2) identifying a set of storage blocks used by the set of file system objects, and 3) copying the set of storage blocks to a journal of the continuous data protection system.

In some embodiments, the method may also include updating the continuous data protection system with storage metadata that changed while the continuous data protection system missed the set of changes. Such storage metadata may include a volume table of contents, a partition table, and/or virtualization metadata.

The method may also include inserting a blackout window into the timeline of the continuous data protection system. The blackout window may span from when the continuous data protection system started to miss changes to when the continuous data protection system was updated with the missed changes.

In some examples, a system for recovering from continuous-data-protection blackouts may include an identification module and an update module. The identification module may be programmed to identify a continuous data protection system that is configured to copy each change made to a set of data and to identify changes made to the set of data but missed by the continuous data protection system. The identification module may also be programmed to identify an alternate change-tracking system that tracks changes made to the set of data. The update module may be programmed to update the continuous data protection system with the missed changes (as tracked by the alternate change-tracking system).

In some embodiments, the identification module may be programmed to identify the set of changes made to the set of data but missed by the continuous data protection system by determining that the continuous data protection system has stopped copying changes made to the set of data. The identification module may be further programmed to record a time when the continuous data protection system stopped copying changes made to the set of data. In some examples, the identification module may determine that the continuous data protection system has stopped copying changes made to the set of data by halting some part of the continuous data protection system, such as the change tracking mechanism. In certain embodiments, the identification module may be programmed to identify the alternate-change tracking system by initiating the alternate change-tracking system.

In some examples, a computer-readable-storage medium may include one or more computer-executable instructions that, when executed by at least one processor of a computing device, cause the computing device to 1) identify a continuous data protection system configured to copy each change made to a set of data, 2) identify a set of changes made to the set of data but missed by the continuous data protection system, 3) identify an alternate change-tracking system that tracks changes made to the set of data, and 4) update the continuous data protection system with the missed changes as tracked by the alternate change-tracking system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for recovering from continuous-data-protection blackouts. A continuous-data-protection blackout may include any period of time during which information regarding changes to protected data may not be accurately recorded. A continuous-data-protection system may experience a blackout due to various reasons, including a malfunction and/or outage of one or more software and/or hardware components of the continuous-data-protection system.

In one context, various systems described herein may recover from a continuous-data protection blackout caused by an upgrade of a change tracking driver in a continuous data protection system. For example, various systems described herein may record the time when the upgrade starts and identify a file change log to track changes during the upgrade process. After the change tracking driver is upgraded and reloaded, the changes recorded in the file change log during the upgrade may be used for updating a journal that stores changes for the continuous data protection system.

As will be explained below, by updating a continuous data protection system with data changes tracked by an alternate change-tracking system while the continuous data protection system was not tracking changes, systems and methods described herein may increase the reliability of the continuous data protection system in a variety of contexts (e.g., updates to the continuous data protection system, live booting of an alternate operating system, etc.). Furthermore, the systems and methods described herein may increase reliability without an inordinate consumption of computing resources (e.g., the resource consumption occasioned by performing a brute force search for any changes during a blackout of the continuous data protection system).

Figure 1:
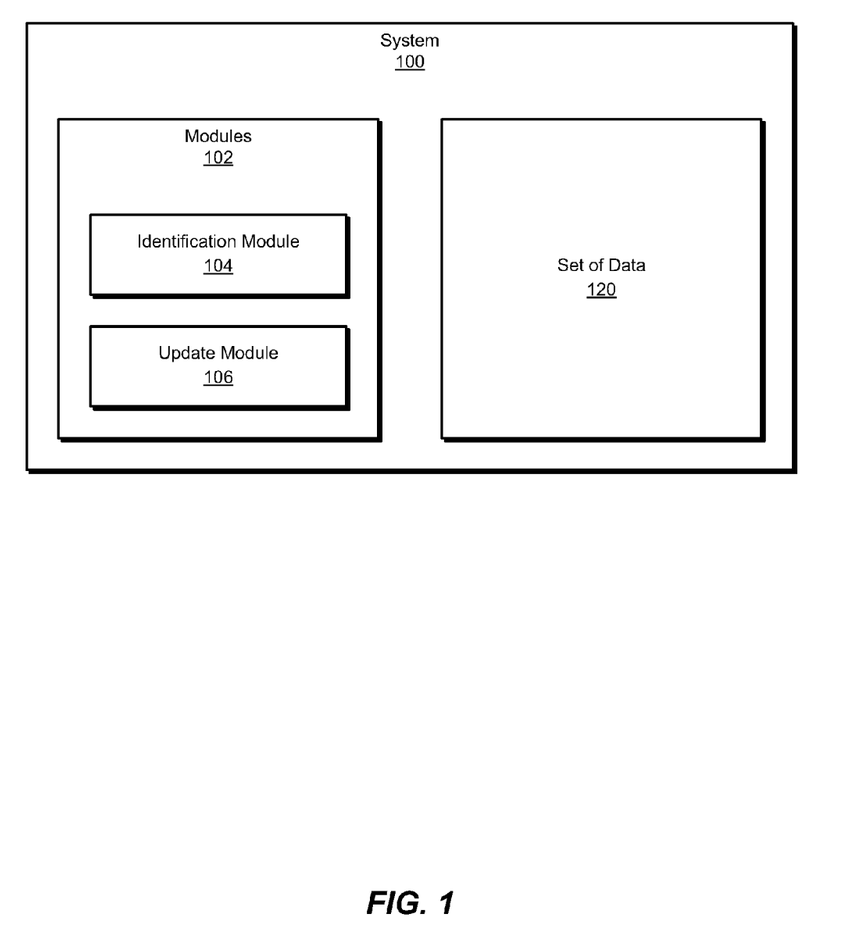
FIG. 1 is a block diagram of an exemplary system for recovering from continuous-data-protection blackouts.
Figure 2:
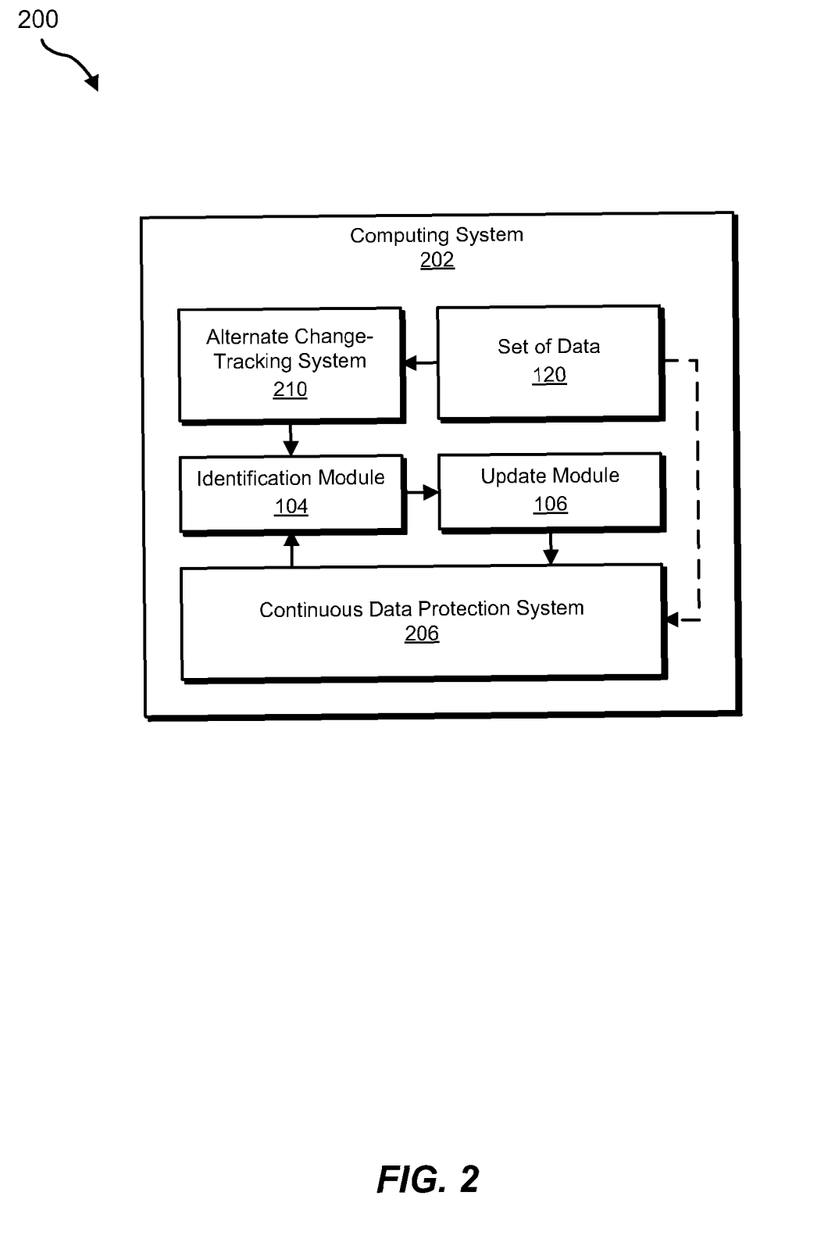
FIG. 2 is a block diagram of an exemplary system for recovering from continuous-data-protection blackouts.
Figure 3:
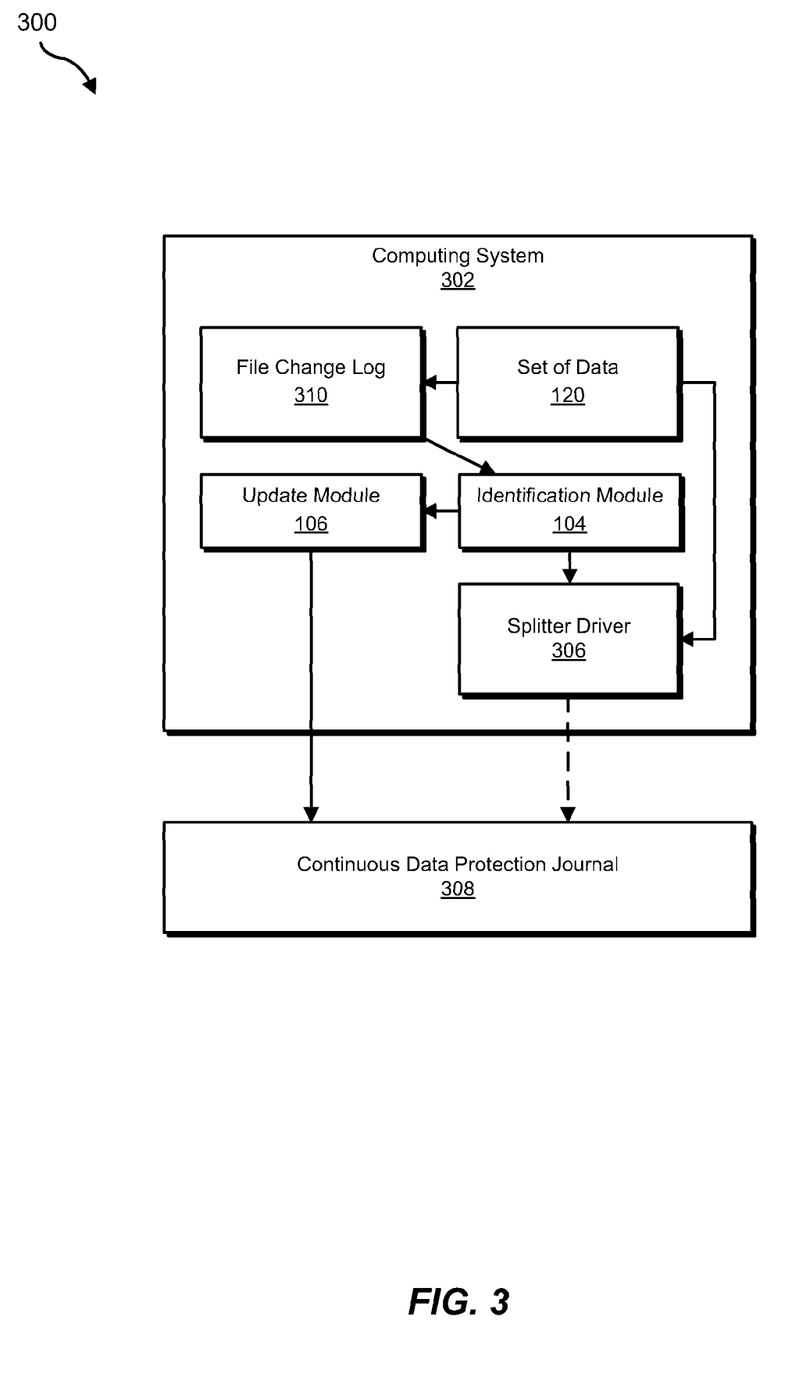
FIG. 3 is a block diagram of an exemplary system for recovering from continuous-data-protection blackouts.

The following will provide, with reference to FIGS. 1-3, detailed descriptions of exemplary systems for recovering from continuous-data-protection blackouts. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for recovering from continuous-data-protection blackouts. As illustrated in this figure, exemplary system 100 may include one or more modules 102 for performing one or more tasks. For example, and as will be explained in greater detail below, exemplary system 100 may include an identification module 104 programmed to identify a continuous data protection system configured to copy each change made to a set of data and identify a set of changes made to the set of data but missed by the continuous data protection system. Identification module 104 may also be programmed to identify an alternate change-tracking system that tracks changes made to the set of data.

Exemplary system 100 may also include an update module 106 programmed to update the continuous data protection system with the missed changes as tracked by the alternate change-tracking system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a set of data 120. Set of data 120 may represent a portion of one or more computing devices. For example, set of data 120 may represent a portion of computing system 202 in FIG. 2, computing system 510 in FIG. 5, and/or portions of exemplary network architecture 600 in FIG. 6. Alternatively, set of data 120 in FIG. 1 may represent one or more physically separate devices capable of being accessed by a computing device, such as primary storage device 532 in FIG. 5 and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

FIG. 2 is a block diagram of an exemplary system 200 for recovering from continuous-data-protection blackouts. As shown in FIG. 2, system 200 may include a computing system 202. In one embodiment, and as will be described in greater detail below, computing system 202 may be programmed to recover from a continuous data protection blackout (e.g., a blackout of a continuous data protection system 206).

For example, identification module 104 may be programmed to identify a continuous data protection system (such as continuous data protection system 206) configured to copy each change made to a set of data (such as set of data 120). Identification module 104 may also be programmed to identify a set of changes made to the set of data but missed by the continuous data protection system (e.g., identification module 104 may identify a set of changes made to set of data 120 but missed by continuous data protection system 206). Identification module 104 may be further programmed to identify an alternate change-tracking system (such as an alternate change-tracking system 210) that tracks changes made to the set of data (e.g., set of data 120).

Update module 106 may then update the continuous data protection system with the missed changes as tracked by the alternate change-tracking system (e.g., update module 106 may update continuous data protection system 206 with the missed changes as tracked by alternate change-tracking system 210).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Continuous data protection system 206 may represent a portion of one or more computing devices, such as a desktop computer, a storage device, or a separate continuous data protection appliance. For example, continuous data protection system 206 may represent a portion of computing system 202 in FIG. 2, backup storage device 533 in FIG. 5, and/or server 640 in FIG. 6.

FIG. 3 is a block diagram of an exemplary system 300 for recovering from continuous-data-protection blackouts. As shown in FIG. 3, system 300 may include a computing system 302. In one embodiment, and as will be described in greater detail below, computing system 302 may be programmed to recover from a continuous data protection blackout.

Computing system 302 may be programmed with identification module 104 and update module 106. Identification module 104 may be programmed to identify a splitter driver (e.g., a splitter driver 306). The splitter driver may copy changes made to a set of data to a journal (e.g., splitter driver 306 may copy changes made to set of data 120 to continuous data protection journal 308). Identification module 104 may also be programmed to determine that splitter driver 306 has been unloaded. Identification module 104 may further identify a file change log (e.g., file change log 310) that tracks changes made to set of data 120 while splitter driver 306 is unloaded.

Identification module 104 may determine at some point that splitter driver 306 (e.g., an upgraded version of splitter driver 306) has been reloaded. Update module 106 may then update continuous data protection journal 308 with the changes that were made to set of data 120 while splitter driver 306 was offline by copying the changes from file change log 310.

As used herein, the phrase "splitter driver" may refer to any driver, module, component, and/or subsystem that intercepts and/or observes data changes, such as changes to the set of data. For example, the phrase "splitter driver" may refer to a change-tracking driver.

Figure 4:
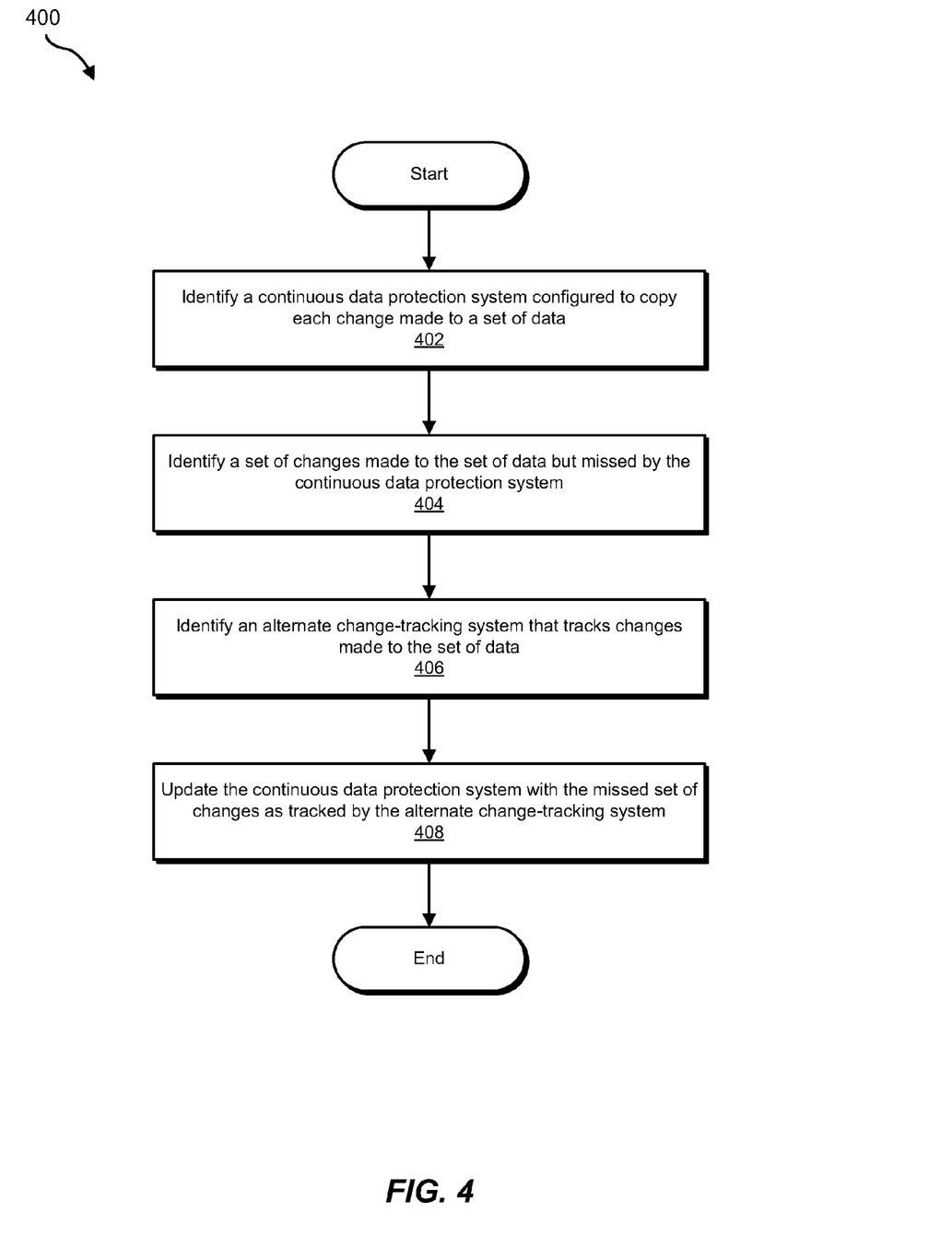
FIG. 4 is a flow diagram of an exemplary method for recovering from continuous-data-protection blackouts.

FIG. 4 is a flow diagram of an exemplary computer-implemented method 400 for recovering from continuous-data-protection blackouts. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may identify a continuous data protection system configured to copy each change made to a set of data. For example, at step 402 identification module 104 may, as part of computing system 202, identify continuous data protection system 206 configured to copy each change made to set of data 120. As used herein, the phrase "continuous data protection system" may refer to any system, device, and/or appliance configured to provide continuous and/or real-time backup services. Likewise, the phrase "set of data" may refer to any volume, storage device, storage system, set of files and/or other collection of data backed up by the continuous data protection system.

Identification module 104 may identify the continuous data protection system in any suitable manner. For example, identification module 104 may identify the continuous data protection system by reading a configuration file that contains information identifying the continuous data protection system. Additionally or alternatively, identification module 104 may identify the continuous data protection system by receiving a message from the continuous data protection system. In some examples, identification module 104 may identify the continuous data protection system by being launched by the continuous data protection system.

Identification module 104 may identify the continuous data protection system by identifying one or more components of the continuous data protection system. For example, identification module 104 may identify a splitter driver that operates as part of the continuous data protection system (such as splitter driver 306 of FIG. 3) or a journal storing data changes preserved by the continuous data protection system (such as continuous data protection journal 308 of FIG. 3).

At step 404 one or more of the systems described herein may identify a set of changes made to the set of data but missed by the continuous data protection system. For example, at step 404 identification module 104 may, as part of computing system 202, identify a set of changes made to set of data 120 but missed by continuous data protection system 206. As used herein, the term "set" may refer to a group of one or more. For example, the set of changes may include one or more change to the set of data.

Identification module 104 may identify the set of changes made to the set of data but missed by the continuous data protection system in a variety of contexts. For example, identification module 104 may identify the set of missed changes by identifying a time period during which the continuous data protection system failed to copy changes made to the set of data. In this context, identification module 104 may identify the set of changes even before identifying any individual change to the set of data missed by the continuous data protection system (e.g., identification module 104 may identify the set of changes as "any change to the set of data between 10:58:04 and 10:58:56"). Identification module 104 may use clock time or another other suitable indicator for identifying the period during which the continuous data protection system failed to copy changes.

Identification module 104 may identify the relevant time period in various ways. For example, identification module 104 may identify the relevant time period by reading from a log file (e.g., identification module 104 may read a log file that shows that a period of time during which an alternate operating system, such as a live-booted operating system, ran without ever loading the continuous data protection system). Additionally or alternatively, identification module 104 may identify the relevant time period in part by determining that the continuous data protection system has stopped copying changes made to the set of data and, as part of that determination, recording a time when the continuous data protection system stopped copying changes made to the set of data (e.g., recording "10:58:04" as the time that the continuous data protection system stopped copying changes made to the set of data).

Identification module 104 may determine that the continuous data protection system has stopped copying changes made to the set of data in a variety of ways. For example, identification module 104 may receive a message (such as an error message or a warning message) from the continuous data protection system. In some embodiments, identification module 104 may halt a part of the continuous data protection system. For example, identification module 104 may unload a splitter driver (such as splitter driver 306 in FIG. 3). In such embodiments, by halting the part of the continuous data protection system, identification module 104 may determine that the continuous data protection system has stopped copying changes.

In another context, identification module 104 may sync a file system that includes the set of data by committing each pending file system operation. In this manner, each change to the set of data attempted by an application will be reflected in the set of data. Accordingly, identification module 104 may more completely identify the set of changes made to the set of data but missed by the continuous data protection system.

Returning to FIG. 4, at step 406 one or more of the systems described herein may identify an alternate change-tracking system that tracks changes made to the set of data. For example, at step 406 identification module 104 may, as part of computing system 202, identify alternate change-tracking system 210 that tracks changes made to set of data 120. As used herein, the phrase "alternate change-tracking system" may refer to any system or component that may track data changes and/or record information constituting, revealing, and/or describing data changes.

Identification module 104 may identify any suitable alternate change-tracking system. For example, identification module 104 may identify a file change log (e.g., the file change log of a file system, such as NTFS), such as file change log 310 of FIG. 3.

Identification module 104 may identify the alternate change-tracking system in any suitable manner. For example, identification module 104 may identify the alternate change-tracking system by reading a configuration file. Additionally or alternatively, identification module 104 may identify the alternate change-tracking system by determining which file system manages the set of data and identifying an alternate change-tracking system that operates as a part of the file system. In some examples, identification module 104 may identify the alternate change-tracking system by scanning a storage system for logs of known change-tracking systems. Identification module 104 may also identify the alternate change-tracking system in the course of initiating the alternate change-tracking system and/or instructing the alternate change-tracking system to track changes to the set of data.

Returning to FIG. 4, at step 408 one or more of the systems described herein may update the continuous data protection system with the missed set of changes as tracked by the alternate change-tracking system. For example, at step 408 update module 106 may, as part of computing system 202, update continuous data protection system 206 with the missed set of changes as tracked by alternate change-tracking system 210.

Update module 106 may update the continuous data protection system with the missed set of changes in a variety of ways. For example, update module 106 may update the continuous data protection system with the missed set of changes as tracked by the alternate change-tracking system by writing the missed set of changes to a journal of the continuous data protection system (such as continuous data protection journal 308 of FIG. 3). As used herein, the term "journal" may refer to any journal, log, and/or other data structure used to store data changes for a continuous data protection system.

In another example, update module 106 may update the continuous data protection system by identifying a set of file system objects affected by the missed set of changes (e.g., update module 106 may determine what files were changed by the missed set of changes). As used herein, the phrase "file system object" may refer to any group of data that manifests as a file-system-level abstraction, such as an inode, a file, and/or a directory. Update module 106 may then identify a set of storage blocks used by the set of file system objects. As used herein, the phrase "storage block" may refer to any group of data that manifests as a storage-level abstraction (e.g., a unit of storage corresponding to a physical location on a storage device or a virtual location on a virtual storage device). Update module 106 may then copy the set of storage blocks to a journal of the continuous data protection system (such as continuous data protection journal 308 of FIG. 3). In this manner, update module 106 may identify the missed data changes in one format via the alternate change-tracking system and update the continuous data protection system with the missed data changes in a different format.

In some embodiments, one or more of the systems described herein may update the continuous data protection system with storage metadata that changed while the continuous data protection system missed the set of changes. As used herein, the phrase "storage metadata" may refer to any data relating to a storage system and/or not tracked by the alternate change-tracking system. For example, the storage metadata may include metadata relating to a volume (such as a volume table of contents), metadata relating to partitions of a storage device (such as a partition table), and/or virtualization metadata (e.g., private regions, such as private regions maintained by VERITAS VOLUME MANAGER). Because the size of storage metadata may be minimal, syncing the continuous data protection system with the latest version of the storage metadata may not be a very resource-intensive operation.

In some embodiments, one or more of the systems described herein may insert a blackout window into a timeline of the continuous data protection system. As used herein, the phrase "blackout window" may refer to any information indicating when a continuous-data-protection system blackout occurred. The blackout window may span a suitable range of time, such from when the continuous data protection system stopped copying changes made to the set of data to when the continuous data protection system was updated with the missed set of changes.

In one context, various systems described herein may recover from a continuous-data protection blackout caused by an upgrade of a splitter driver in a continuous data protection system. For example, identification module 104 may generate a timestamp when the upgrade process starts. Identification module 104 may also initiate file change logging on all file systems covered by the continuous data protection system (according to some embodiments, however, the file change logs may already be actively logging changes on the relevant file systems, in which case identification module 104 may merely identify the file change log). Identification module 104 may then unload the splitter driver. After the splitter driver is upgraded and reloaded, identification module 104 may stop any file change logging that it initiated. Identification module 104 may also sync each file system covered by the continuous data protection system in order to commit any pending changes to persistent storage.

Update module 106 may then scan the file change logs to determine which file system objects (e.g., inodes) changed since the timestamp was recorded. In some embodiments, the continuous data protection system may save block-level changes. In such embodiments, update module 106 may query each file system for information to translate the file-level changes to block-level changes (e.g., update module 106 may query the file system for inode-allocation lists). Update module 106 may then copy the changes gleaned from the file change logs (whether as file-level changes or block-level changes) to a journal or a log used by the continuous data protection system to store changes. In some embodiments, update module 106 may perform this copying step as part of a background task. After updating the continuous data protection journal and/or log, update module 106 may insert a blackout-window into the continuous data protection timeline from the time of the timestamp to the current time.

Figure 5:
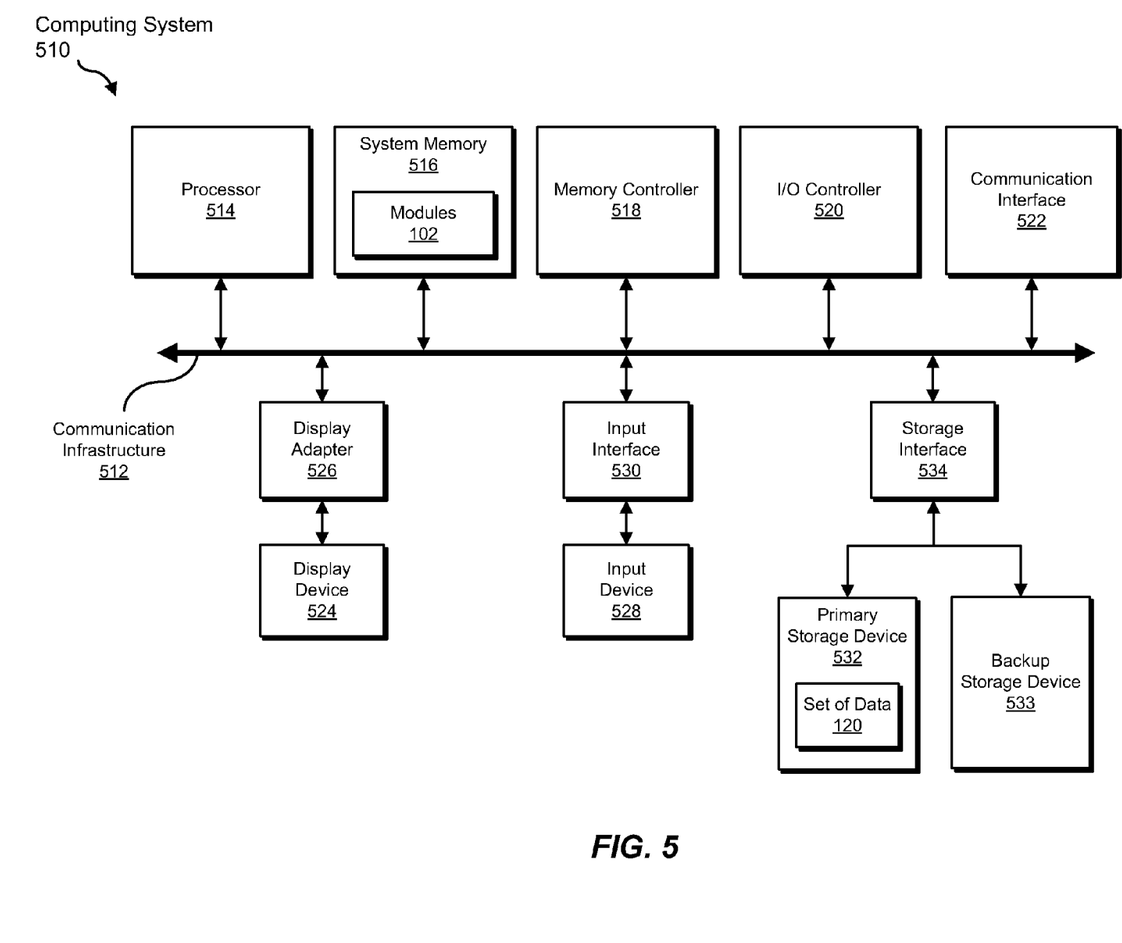
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, recording, halting, unloading, syncing, initiating, updating, copying, and/or inserting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, recording, halting, unloading, syncing, initiating, updating, copying, and/or inserting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, recording, halting, unloading, syncing, initiating, updating, copying, and/or inserting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, recording, halting, unloading, syncing, initiating, updating, copying, and/or inserting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, recording, halting, unloading, syncing, initiating, updating, copying, and/or inserting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, set of data 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, recording, halting, unloading, syncing, initiating, updating, copying, and/or inserting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
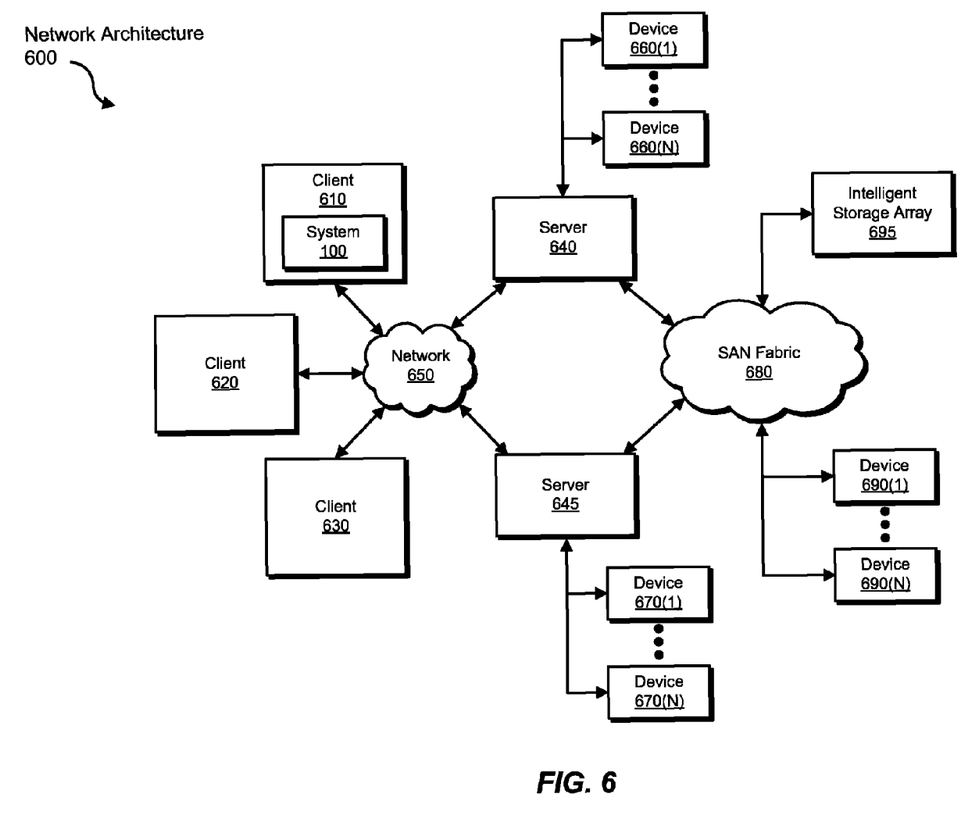
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, recording, halting, unloading, syncing, initiating, updating, copying, and/or inserting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for recovering from continuous-data-protection blackouts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an incomplete continuous data protection journal into a complete continuous data protection journal. As another example, one or more of the modules described herein may transform a computing system into an efficient system for recovering from continuous data protection blackouts.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for recovering from continuous-data-protection blackouts, at least a portion of the method being performed by a computing device comprising at least one processor, the method comprising:
    identifying a continuous data protection system that includes a splitter driver configured to copy each change made to a set of data in real time;
    determining that the splitter driver has been unloaded, wherein the continuous data protection system blacks out while the splitter driver is unloaded;
    identifying a set of changes made to the set of data but missed by the continuous data protection system as a result of the continuous data protection system blacking out and not copying one or more changes that were made to the set of data while the continuous data protection system was blacked out;
    determining that the splitter driver has been reloaded;
    identifying an alternate change-tracking system that tracks changes made to the set of data;
    in response to determining that the splitter driver has been reloaded, updating the continuous data protection system with the missed set of changes as tracked by the alternate change-tracking system.

2. The computer-implemented method of claim 1, wherein identifying the set of changes made to the set of data but missed by the continuous data protection system comprises determining that the continuous data protection system has stopped copying changes made to the set of data.

3. The computer-implemented method of claim 2, wherein determining that the continuous data protection system has stopped copying changes made to the set of data comprises recording a time when the continuous data protection system stopped copying changes made to the set of data.

4. The computer-implemented method of claim 2, wherein determining that the continuous data protection system has stopped copying changes made to the set of data comprises halting at least a part of the continuous data protection system.

5. The computer-implemented method of claim 4, wherein halting at least a part of the continuous data protection system comprises unloading a change tracking driver.

6. The computer-implemented method of claim 1, wherein identifying the alternate change-tracking system that tracks changes made to the set of data comprises initiating the alternate change-tracking system.

7. The computer-implemented method of claim 1, wherein the alternate change-tracking system comprises a file change log.

8. The computer-implemented method of claim 1, wherein updating the continuous data protection system with the missed set of changes as tracked by the alternate change-tracking system comprises writing the missed set of changes to a journal of the continuous data protection system.

9. The computer-implemented method of claim 1, wherein updating the continuous data protection system with the missed set of changes as tracked by the alternate change-tracking system comprises:
    identifying a set of file system objects affected by the missed set of changes;
    identifying a set of storage blocks used by the set of file system objects;
    copying the set of storage blocks to a journal of the continuous data protection system.

10. The computer-implemented method of claim 1, further comprising updating the continuous data protection system with storage metadata that changed while the continuous data protection system missed the set of changes.

11. The computer-implemented method of claim 10, wherein the storage metadata comprises at least one of:
    a volume table of contents;
    a partition table;
    virtualization metadata.

12. The computer-implemented method of claim 1, further comprising inserting a blackout window into a timeline of the continuous data protection system, the blackout window spanning from when the continuous data protection system stopped copying changes made to the set of data to when the continuous data protection system was updated with the missed set of changes.

13. The computer-implemented method of claim 1, wherein identifying the set of changes made to the set of data but missed by the continuous data protection system comprises syncing a file system that includes the set of data by committing each pending file system operation.

14. A system for recovering from continuous-data-protection blackouts, the system comprising:
    an identification module programmed to:
        identify a continuous data protection system that includes a splitter driver configured to copy each change made to a set of data in real time;
        determine that the splitter driver has been unloaded, wherein the continuous data protection system blacks out while the splitter driver is unloaded;
        identify a set of changes made to the set of data but missed by the continuous data protection system as a result of the continuous data protection system blacking out and not copying one or more changes that were made to the set of data while the continuous data protection system was blacked out;
        determine that the splitter driver has been reloaded;
        identify an alternate change-tracking system that tracks changes made to the set of data;
    an update module programmed to, in response to the determination that the splitter driver has been reloaded, update the continuous data protection system with the missed set of changes as tracked by the alternate change-tracking system;
    at least one processor configured to execute the identification module and the update module.

15. The system of claim 14, wherein the identification module is programmed to identify the set of changes made to the set of data but missed by the continuous data protection system by determining that the continuous data protection system has stopped copying changes made to the set of data.

16. The system of claim 15, wherein the identification module is programmed to determine that the continuous data protection system has stopped copying changes made to the set of data by recording when the continuous data protection system stopped copying changes made to the set of data.

17. The system of claim 15, wherein the identification module is programmed to determine that the continuous data protection system has stopped copying changes made to the set of data by halting at least a part of the continuous data protection system.

18. The system of claim 17, wherein the identification module is programmed to halt at least a part of the continuous data protection system by unloading a change tracking driver.

19. The system of claim 14, wherein the identification module is programmed to identify the alternate change-tracking system that tracks changes made to the set of data by initiating the alternate change-tracking system.

20. A physical computer-readable-storage medium comprising one or more computer-executable instructions that, when executed by at least one processor of a computing device, cause the computing device to:

identify a continuous data protection system that includes a splitter driver configured to copy each change made to a set of data in real time;

determine that the splitter driver has been unloaded, wherein the continuous data protection system blacks out while the splitter driver is unloaded;

identify a set of changes made to the set of data but missed by the continuous data protection system as a result of the continuous data protection system blacking out and not copying one or more changes that were made to the set of data while the continuous data protection system was blacked out;

determine that the splitter driver has been reloaded;

identify an alternate change-tracking system that tracks changes made to the set of data;

in response to determining that the splitter driver has been reloaded, update the continuous data protection system with the missed set of changes as tracked by the alternate change-tracking system.

* * * * *